(12) United States Patent
Shimada et al.

(10) Patent No.: US 7,513,709 B2
(45) Date of Patent: Apr. 7, 2009

(54) UNIVERSAL JOINT

(75) Inventors: Yutaka Shimada, Kashihara (JP);
Tatsutomo Yokozeki, Tenri (JP);
Takeshi Matsuda, Yamatokoriyama (JP)

(73) Assignee: Jtekt Corporation, Osaka (JP)

( * ) Notice: Subject to any disclaimer, the term of this patent is extended or adjusted under 35 U.S.C. 154(b) by 72 days.

(21) Appl. No.: 11/727,882

(22) Filed: Mar. 28, 2007

(65) Prior Publication Data

US 2007/0237571 A1  Oct. 11, 2007

(30) Foreign Application Priority Data

Mar. 30, 2006 (JP) ............................. 2006-095408

(51) Int. Cl.
*F16D 3/00* (2006.01)

(52) U.S. Cl. .................. 403/399; 403/236; 403/318; 403/319; 403/355; 464/134

(58) Field of Classification Search .................. 403/10, 403/235, 236, 316, 317, 318, 319, 320, 355, 403/374.1, 374.2, 374.3, 386, 398, 399; 464/134
See application file for complete search history.

(56) References Cited

U.S. PATENT DOCUMENTS

| | | | |
|---|---|---|---|
| 4,900,178 A * | 2/1990 | Haldric et al. ............... | 403/373 |
| 5,046,881 A * | 9/1991 | Swager ........................ | 403/317 |
| 5,253,949 A * | 10/1993 | Oxley et al. ................. | 403/317 |
| 5,707,113 A | 1/1998 | Russell | |
| 5,810,532 A | 9/1998 | Huang | |
| 6,155,739 A | 12/2000 | Sekine et al. | |
| 6,443,650 B2 * | 9/2002 | Ikeda ......................... | 403/290 |
| 2002/0131820 A1 | 9/2002 | Daniel et al. | |

FOREIGN PATENT DOCUMENTS

| | | |
|---|---|---|
| DE | 89 06 253 U1 | 8/1989 |
| EP | 1 104 736 A1 | 6/2001 |
| FR | 2 815 924 | 5/2002 |
| JP | 3023464 | 1/1996 |

OTHER PUBLICATIONS www.world.altavista.com. YAHOO! Babel Fish online translation of EP 1 104 736. Paragraphs [0025-0029]. Aug. 1, 2008.*

* cited by examiner

*Primary Examiner*—Michael P Ferguson
(74) *Attorney, Agent, or Firm*—Rabin & Berdo, PC (57) ABSTRACT

A universal joint includes a yoke having a fitting portion for fitting a shaft. The fitting portion has first and second tabs opposed to each other to form a U shape. A fixing mechanism including a bolt passing through respective insertion holes in the first and second tabs and a nut screwed onto the bolt on a fastening axis fastens and fixes the shaft between the first and second tabs. A nut holding member fixed to the second tab has an engaging piece. The engaging piece causes the nut, which has not been screwed onto the bolt, to be held on the fastening axis. A cover held by the nut holding member covers at least the engaging piece around the nut.

8 Claims, 9 Drawing Sheets

UNIVERSAL JOINT

BACKGROUND OF THE INVENTION

1. Field of the Invention

The present invention relates to a universal joint.

2. Description of Related Arts

A coupling structure between a universal joint and a shaft is applied to a steering apparatus for an automobile, for example. In the steering apparatus, a steering shaft having an end connected to a handle and a pinion shaft of a steering mechanism are connected to each other through an intermediate shaft. Universal joints are respectively provided at both ends of the intermediate shaft. A yoke in the universal joint is coupled to a shaft end corresponding thereto.

For example, the yoke in the universal joint has a fitting portion in a U shape. The end of the steering shaft is fitted into the fitting portion. A bolt penetrates the fitting portion of the yoke at an end on the opening side of the U shape, and is screwed into a nut, so that the end of the steering shaft is fastened from both of its sides.

A cover mounted on a nut for covering the nut is known (see Document 1: Japanese Utility Model No. 3023464, for example).

In a case where the above-mentioned coupling structure is arranged in the interior of a crew compartment of an automobile, however, a foreign material such as a carpeting fiber in the crew compartment is liable to adhere to and accumulate on a nut and a locking portion in the vicinity of the nut for locking the nut. When the foreign material accumulates on the nut and the like, it takes time and labor to make maintenance.

In order to prevent the adhesion of the foreign material, therefore, it is considered that the cover in the foregoing document 1 is mounted on the nut.

Since the cover can only cover the nut, however, the foreign material cannot be prevented from adhering to and accumulating on the locking portion around the nut. Further, in the cover disclosed in the document 1, a plate spring for fixing is required. Therefore, the number of components is increased, so that the manufacturing cost rises.

An object of the present invention is to provide a universal joint capable of preventing a foreign material from adhering to a nut and the like and being low in cost.

SUMMARY OF THE INVENTION

In a preferred mode of the present invention, there is provided a universal joint comprising a yoke, a fixing mechanism, a nut holding member, and a cover. The yoke includes a fitting portion for fitting a shaft. The fitting portion has a first tab and a second tab parallel to each other to form a U shape. The fixing mechanism fastens and fixes the shaft between the first tab and the second tab. The fixing mechanism includes a bolt passing through an insertion hole provided in the first tab and an insertion hole provided in the second tab, and a nut screwed onto the bolt on a fastening axis. The nut holding member is fixed to the second tab. The nut holding member has an engaging piece engaging with the nut such that the nut, which has not been screwed onto the bolt, is held on the fastening axis. The cover is held by the nut holding member for covering at least the engaging piece around the nut.

According to the present mode, when the universal joint is arranged in the interior of a crew compartment of an automobile, a carpet or the like in the crew compartment is not caught by the engaging piece and tangled therein as a steering operation is performed. Further, a foreign material can be prevented from accumulating between the nut and the engaging piece. Since the nut holding member holds the cover, the number of components can be made smaller, as compared with that in a case where a cover holding member is provided separately from the nut holding member, so that the manufacturing cost can be reduced.

BRIEF DESCRIPTION OF THE DRAWINGS

FIGS. 9A and 9B are partially sectional side views of a cover and an elastic projection, where FIG. 9A shows a state where the cover and the elastic projection engage with each other, and FIG. 9B shows a state where the engagement is being released.

DETAILED DESCRIPTION OF THE PREFERRED EMBODIMENT

Embodiments of the present invention will be now described in detail with reference to the attached drawings.

Although in the present embodiments, description is made of a case where a coupling structure between a yoke and a shaft in a universal joint is applied to a power steering apparatus, the coupling structure is also applicable to other apparatuses such as a manual steering apparatus.

Figure 1:
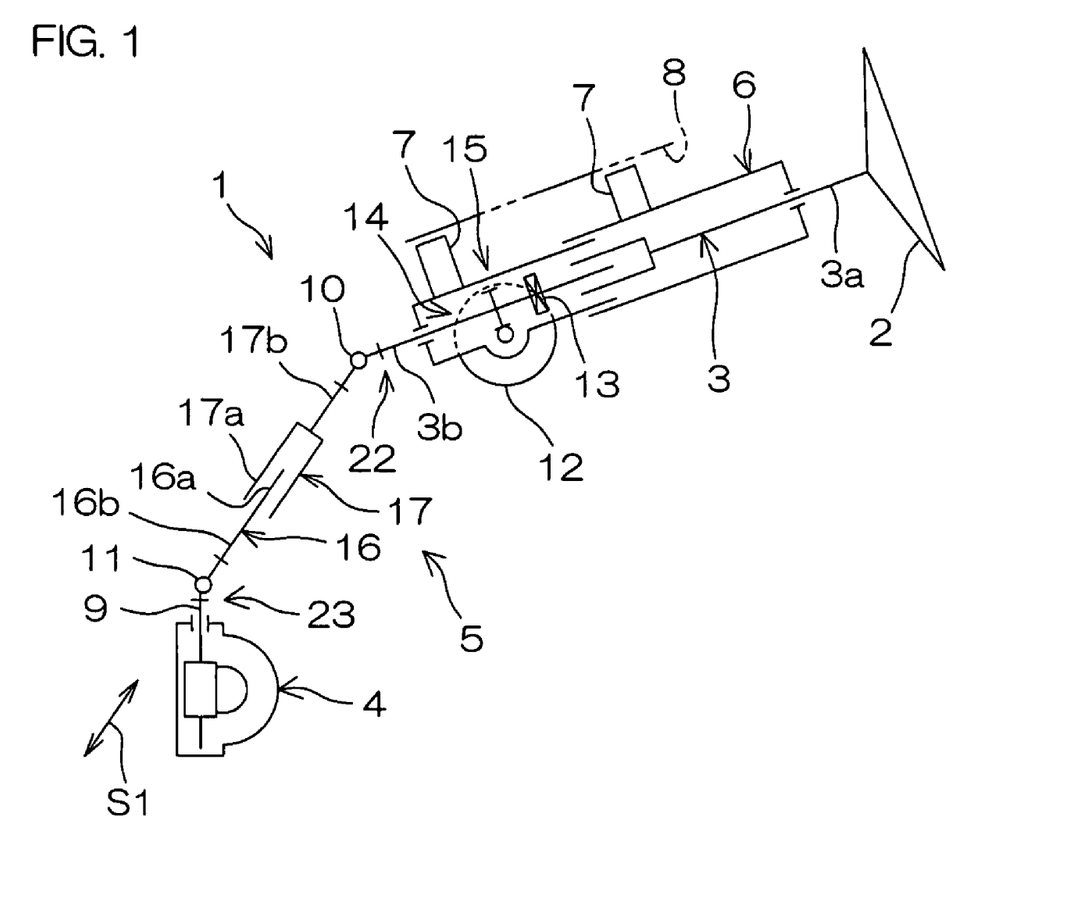
FIG. 1 is a schematic view showing the schematic configuration of a steering apparatus to which a universal joint according to an embodiment of the present invention is applied.

FIG. 1 is a schematic view showing the schematic configuration of a steering apparatus according to an embodiment of the present invention. Referring to FIG. 1, the steering apparatus 1 comprises a steering shaft 3 for rotatably supporting a steering wheel 2 serving as a steering member to transmit steering torque, a steering mechanism 4 composed of a rack-and-pinion mechanism, for example, for steering wheels (not shown) by the steering torque from the steering shaft 3, and an intermediate shaft 5 serving as a shaft coupling provided between the steering shaft 3 and the steering mechanism 4 for transmitting rotation therebetween.

The steering shaft 3 is inserted through a steering column 6 and rotatably supported by the steering column 6. The steering column 6 is supported on a vehicle body 8 through a bracket 7. The steering wheel 2 is connected to one end 3a of the steering shaft 3. An input shaft 9 (e.g., a pinion shaft) in the steering mechanism 4 is connected to the other end 3b of the steering shaft 3 through the intermediate shaft 5. A universal joint 10 is provided at one end of the intermediate shaft 5. A universal joint 11 is provided at the other end of the intermediate shaft 5. When the steering wheel 2 is steered, steering torque produced thereby is transmitted to the input shaft 9 in the steering mechanism 4 through the steering shaft 3 and the intermediate shaft 5. This allows the wheels to be steered.

The universal joints 10 and 11 at both the ends of the intermediate shaft 5 are respectively coupled to the steering shaft 3 and the input shaft 9 serving as corresponding shafts by coupling structures 22 and 23, as described later.

The steering apparatus 1 is configured as a power steering apparatus, so that a steering assist force corresponding to the steering torque is obtained by an electric motor 12 supported on the steering column 6. Specifically, the steering apparatus 1 comprises a torque sensor 13 provided in relation to the steering shaft 3 for detecting the steering torque, the electric motor 12 for producing the steering assist force on the basis of an output signal from the torque sensor 13, a vehicle speed signal, and so on, a reduction gear 14 for reducing the speed of the rotation of an output shaft of the electric motor 12, and a housing 15 accommodating and supporting the reduction gear 14 and the torque sensor 13 and supporting the electric motor 12 to form a part of the steering column 6.

When the steering wheel 2 is operated, the steering torque is detected by the torque sensor 13. The electric motor 12 produces the steering assist force depending on the results of the torque detection, the results of the vehicle speed detection, and so on. The steering assist force is transmitted to the steering shaft 3 through the reduction gear 14, and is transmitted to the steering mechanism 4 from the steering shaft 3 through the intermediate shaft 5 as the steering wheel 2 moves, to steer the wheels.

The intermediate shaft 5 connects the other end 3b of the steering shaft 3 and the input shaft 9 to each other. The intermediate shaft 5 functions to transmit the steering torque applied to the steering wheel 2 for steering the wheels and the steering assist force produced by the electric motor 12 to the input shaft 9 of the steering mechanism 4 from the steering shaft 3.

Figure 2:
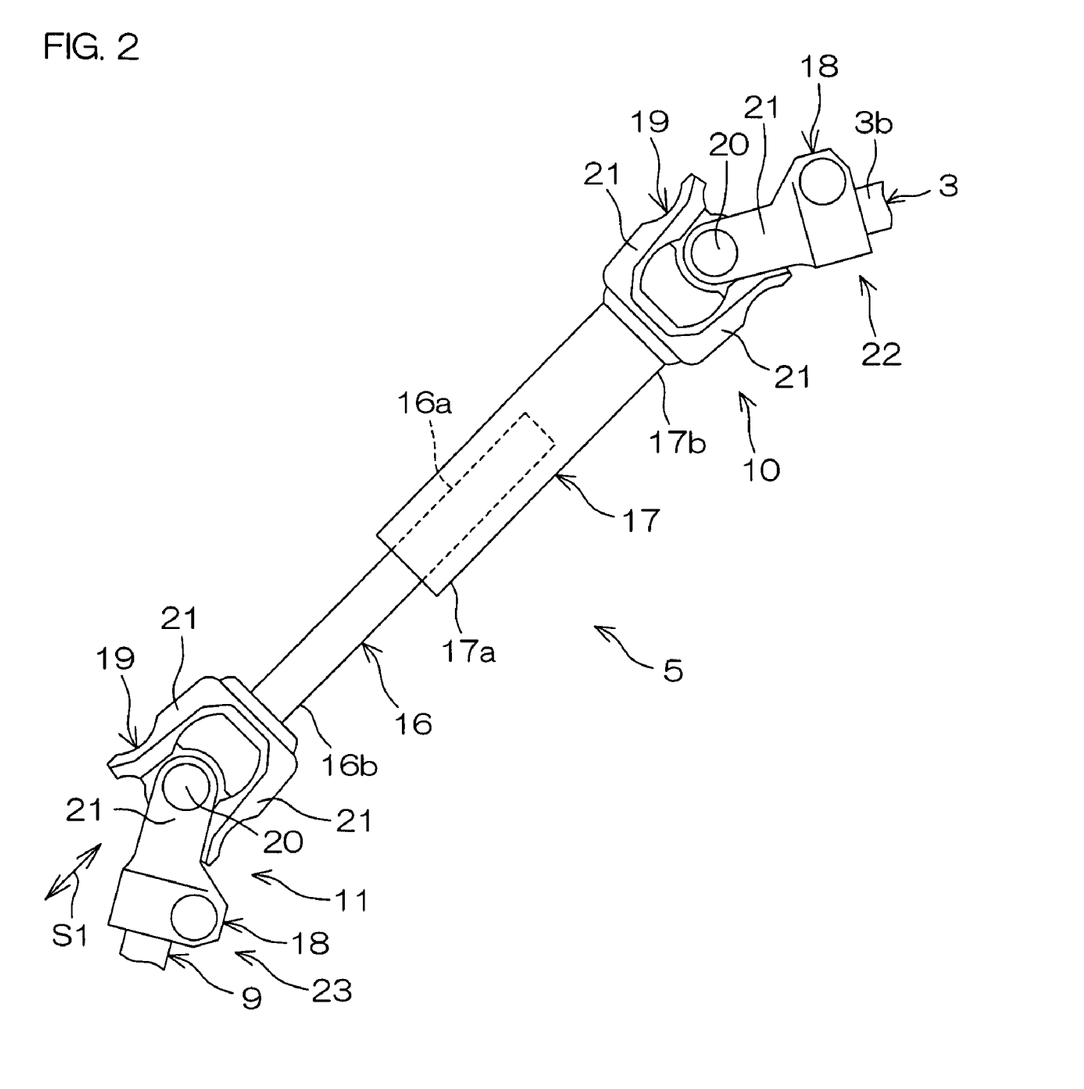
FIG. 2 is a front view of a principal part of the steering apparatus.

FIG. 2 is a front view of a principal part of the steering apparatus 1 shown in FIG. 1, mainly illustrating the intermediate shaft 5. Referring to FIG. 2, the intermediate shaft 5 has an inner shaft 16 and a cylindrical outer shaft 17 that are fitted into each other as telescopic shafts, the universal joint 10 provided at an end 17b of the outer shaft 17 as one end of the intermediate shaft 5, and the universal joint 11 provided at an end 16b of the inner shaft 16 as the other end of the intermediate shaft 5. The universal joint 10 connects the end 3b of the steering shaft 3 and the end 17b of the outer shaft 17 to each other. The universal joint 11 connects the end 16b of the inner shaft 16 and the input shaft 9 to each other.

The inner shaft 16 and the outer shaft 17 are concentrically arranged. The one end 17a of the outer shaft 17 and the one end 16a of the inner shaft 16 are fitted into each other so as to be torque-transmittable, and are made relatively movable by a predetermined amount in an axial direction S1 of the inner shaft 16.

The universal joint 10 comprises a yoke 18 separably coupled to the other end 3b of the steering shaft 3, a yoke 19 fixed to the end 17b of the outer shaft 17 by welding, caulking, or the like, and a joint cross 20 for connecting the yokes 18 and 19 to each other.

The universal joint 11 is configured similarly to the universal joint 10. The universal joint 11 comprises a yoke 18 separably coupled to the end of the input shaft 9, a yoke 19 fixed to the end 16b of the inner shaft 16 by welding, caulking, or the like, and a joint cross 20 for connecting the yokes 18 and 19 to each other.

The joint cross 20 has a body arranged at the center of a cross shape and trunnions serving as four shafts projecting in a cross shape from the body, which are not illustrated. A bearing is mounted on each of the trunnions.

Each of the yokes 18 and 19 has a U shape, and has a pair of arms 21 (a part of which is only illustrated). On each of the arms 21, the corresponding trunnion of the joint cross 20 is rotatably supported through a bearing.

In the present embodiment, the yoke 18 in the universal joint 10 is connected to the end 3b of the steering shaft 3 serving as a corresponding shaft by the coupling structure 22. The yoke 18 in the universal joint 11 is connected to the input shaft 9 serving as a corresponding shaft by the coupling structure 23. The coupling structures 22 and 23 have entirely the same configuration. Description is now made in conformity with the coupling structure 22.

Figure 3:
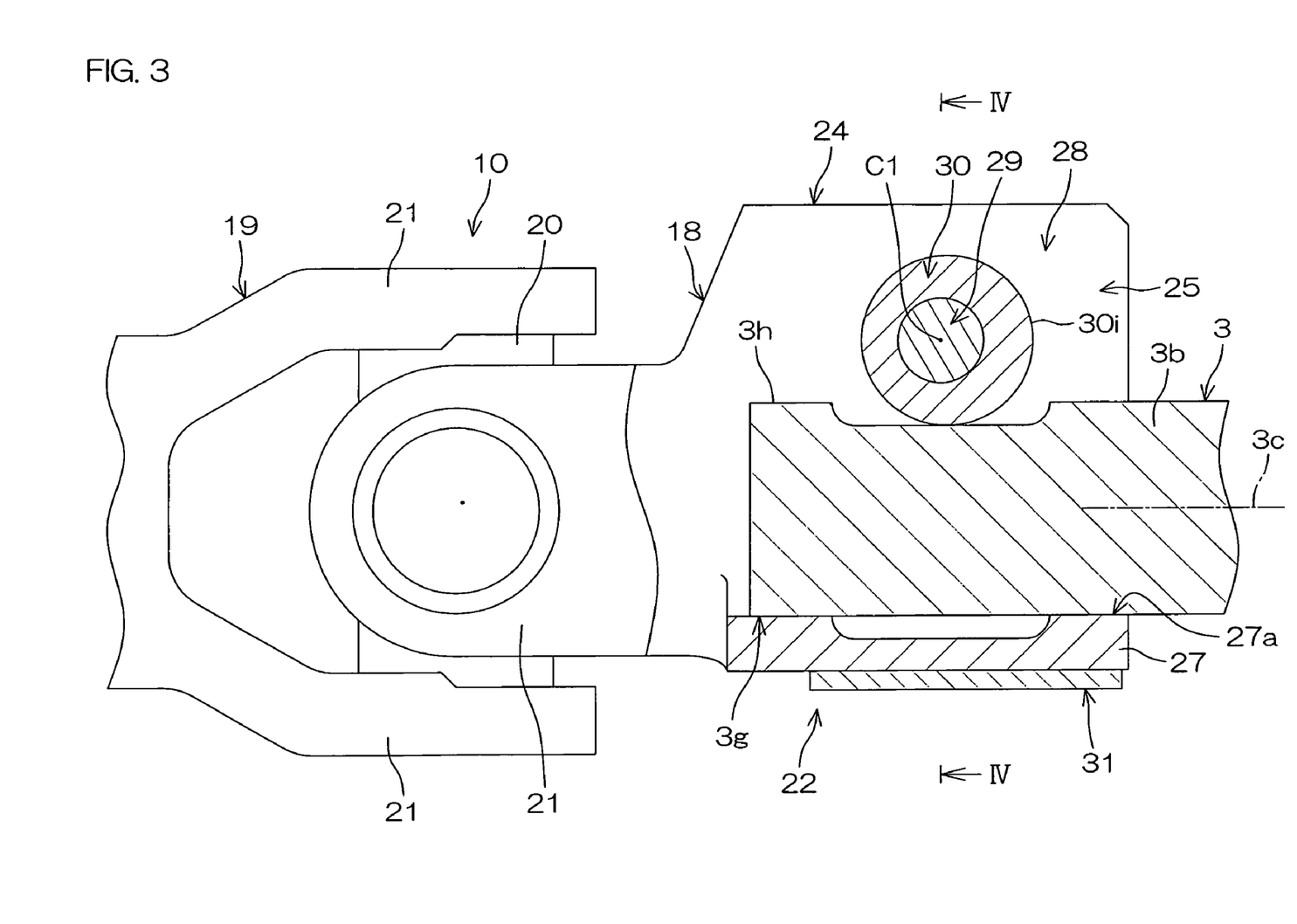
FIG. 3 is a sectional view showing a coupling structure between a universal joint and a shaft, corresponding to a cross section taken along a line III-III shown in FIG. 4.
Figure 4:
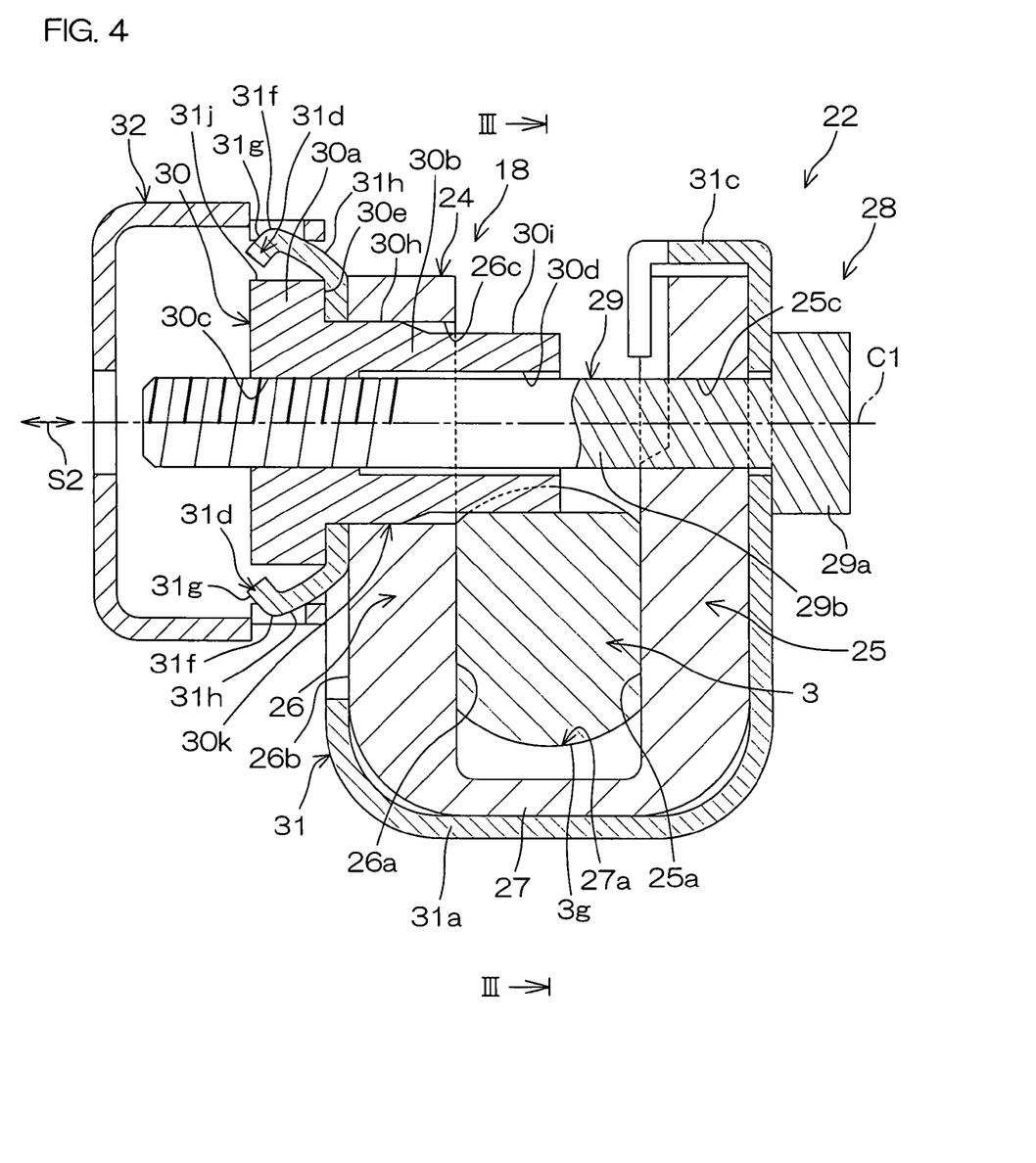
FIG. 4 is a sectional view of a coupling structure in which a shaft has been fixed, corresponding to a section taken along a line IV-IV shown in FIG. 3.
Figure 5:
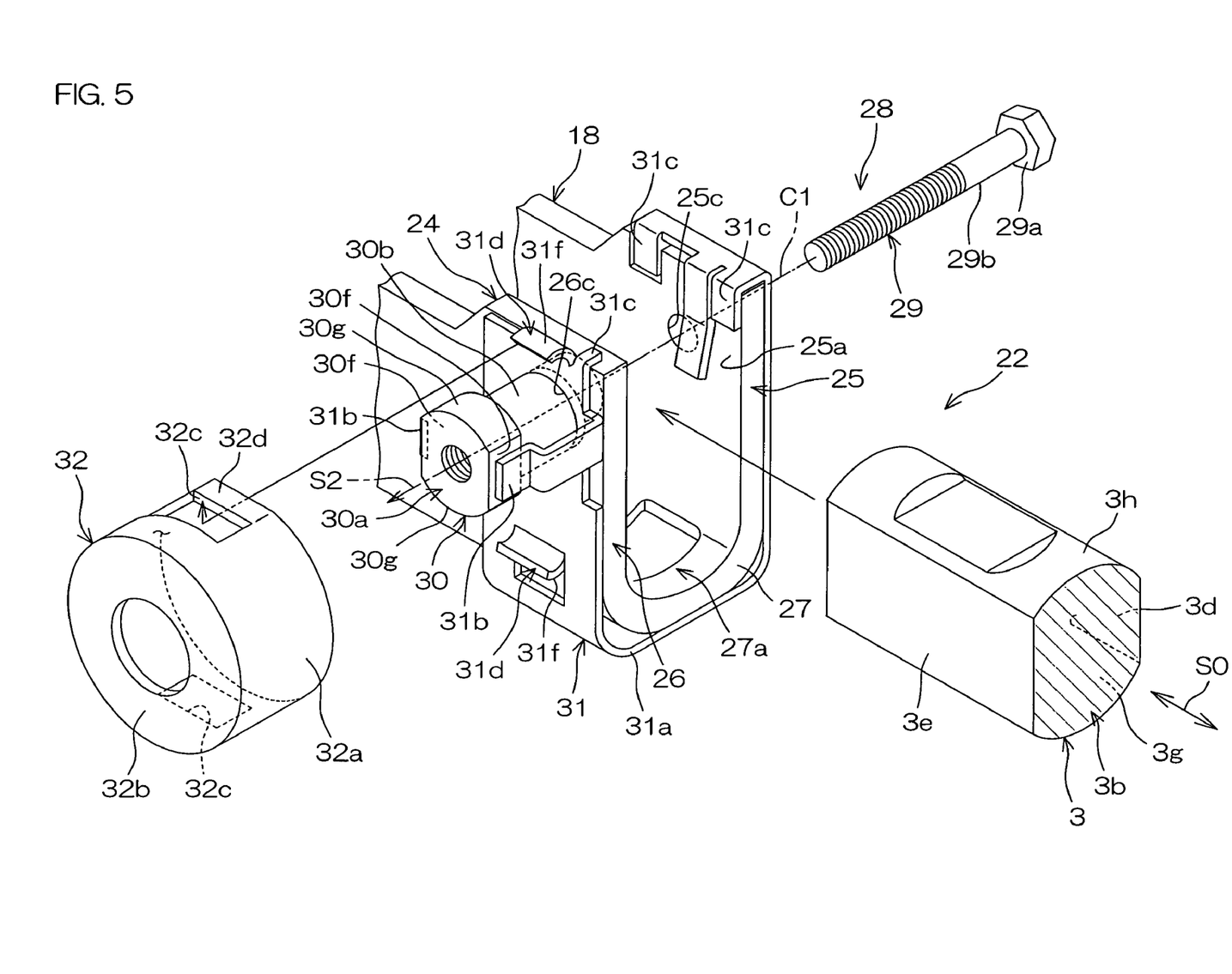
FIG. 5 is an exploded perspective view of a coupling structure.

FIG. 3 is a partially sectional side view of the coupling structure 22, corresponding to a section taken along a line III-III shown in FIG. 4. FIG. 4 is a sectional view of the coupling structure 22, corresponding to a section taken along a line IV-IV shown in FIG. 3. FIG. 5 is an exploded perspective view of the coupling structure 22 in a state where the shaft 3 has not been fixed.

The coupling structure 22 comprises the yoke 18 in the universal joint 10 and the end 3b of the steering shaft 3 serving as a shaft to be connected (hereinafter referred to as a shaft 3).

The yoke 18 includes the pair of arms 21, described above, for connection to the joint cross 20 and a fitting portion 24 fitted into the end 3b of the shaft 3 to form a U shape. The fitting portion 24 connects the arms 21 to each other. The pair of arms 21 and the fitting portion 24 are integrally formed of a single material by press molding.

The fitting portion 24 has a pair of first and second tabs 25 and 26 in a flat plate shape parallel to each other, and a connecting portion 27 for connecting ends of the first and second tabs 25 and 26 to each other in a U shape. The shaft 3 is incorporated into the fitting portion 24 so as to be pressed against an inner side surface 27a serving as the bottom of the connecting portion 27 inside the U shape and also serving as a receiving portion.

The first tab 25 has an insertion hole 25c for inserting a bolt 29. The second tab 26 has an insertion hole 26c for inserting the bolt 29 and holding a nut 30. The insertion holes 25c and 26c are concentrically arranged.

Referring to FIGS. 4 and 5, the coupling structure 22 comprises a fixing mechanism 28 for fastening the shaft 3 between the first and second tabs 25 and 26 in the yoke 18 and fixing the shaft 3 to the yoke 18. The fixing mechanism 28 comprises a bolt 29 serving as a shaft member penetrating the first and second tabs 25 and 26, and the nut 30 screwed onto the bolt 29 on a fastening axis C1. The fastening axis C1 is a center axis of insertion holes 25c and 26c, and a center axis of the bolt 29 and a center axis of a screw hole of the nut 30 are arranged along the center axis. The coupling structure 22 in the present embodiment comprises a nut holding member 31 for holding the nut 30, which has not been screwed onto the bolt 29, on the fastening axis C1, and a cover 32 for covering the nut 30.

The bolt 29 has a head 29a and a screw shaft 29b. A male screw is formed on the screw shaft 29b.

The nut 30 is screwed onto the bolt 29 on the fastening axis C1 to press the shaft 3 against the bottom of the fitting portion 24 by the bolt 29, and functions as a cam nut. The nut 30 includes a nut main body 30a and a cylindrical portion 30b extended from the nut main body 30a and be able to advance into an area between the tabs 25 and 26 through the insertion hole 26c of the second tab 26. The nut main body 30a and the cylindrical portion 30b are integrally formed.

The nut main body 30a is formed so as to have a larger diameter than the cylindrical portion 30b. The nut main body 30a has an end surface 30e serving as a bearing surface opposed to and abutted against the nut holding member 31. The end surface 30e may be abuttable against an outer side surface 26b of the second tab 26 in place of the nut holding member 31. In the present embodiment, description is made in conformity with a case where the end surface 30e is abutted against the nut holding member 31.

The nut 30 has a screw hole 30c and an insertion hole 30d. The screw hole 30c has a female screw. The screw hole 30c and the insertion hole 30d communicate with each other, are arranged on the same axis, and penetrate the nut 30.

Figure 6:
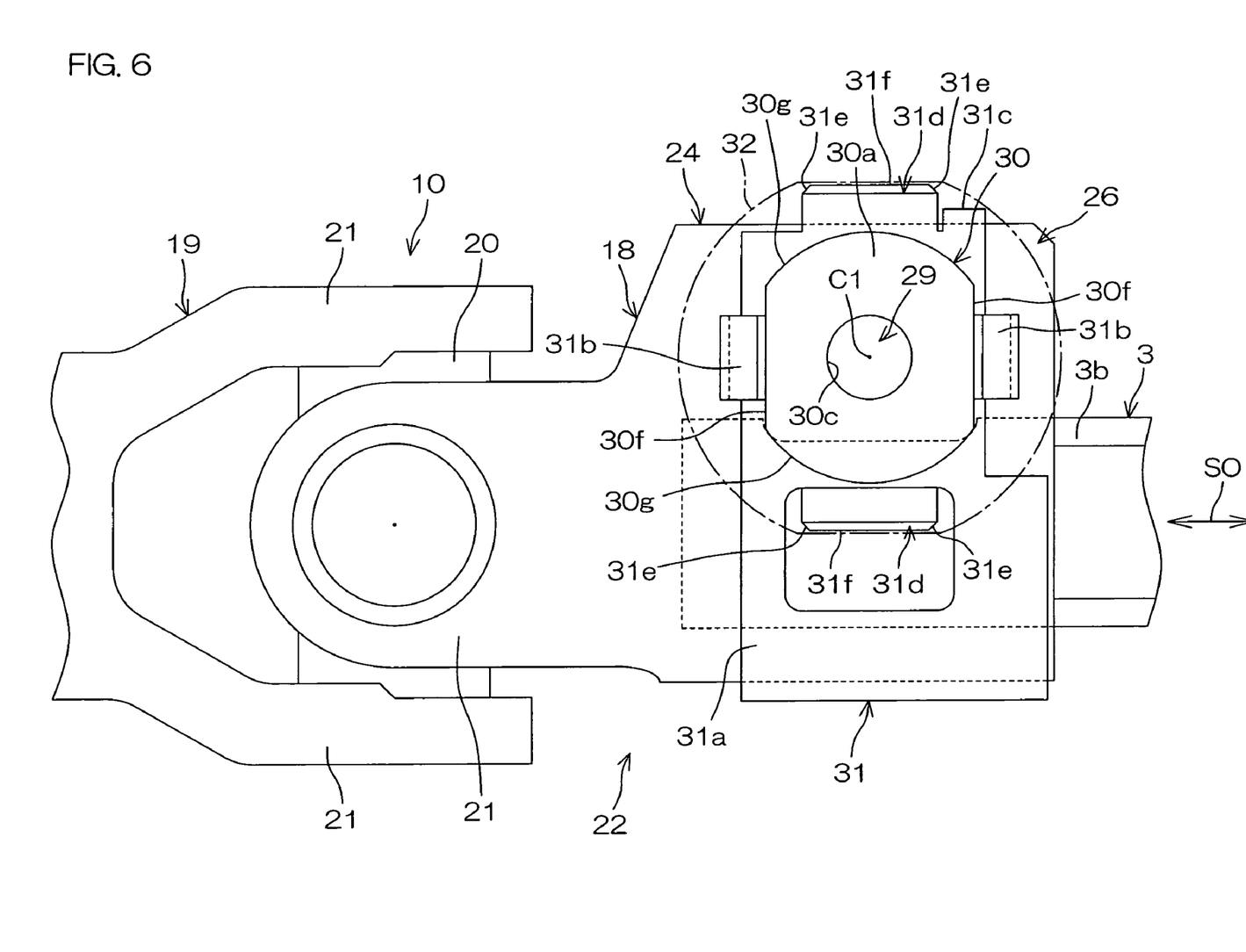
FIG. 6 is a side view of a coupling structure in which a shaft has not been fixed, showing a state where a cover has been removed.
Figure 7A:
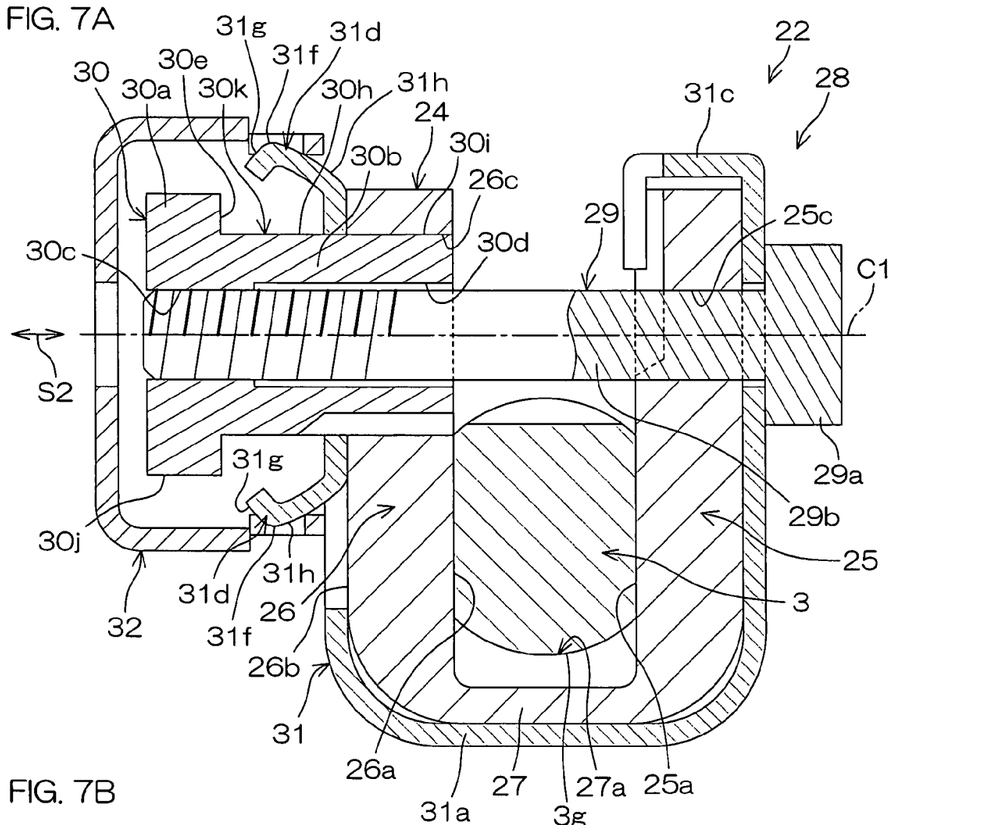
FIGS. 7A and 7B are respectively a longitudinal sectional view and a transverse sectional view of a coupling structure in the early stages of a shaft fixing process.
Figure 7B:
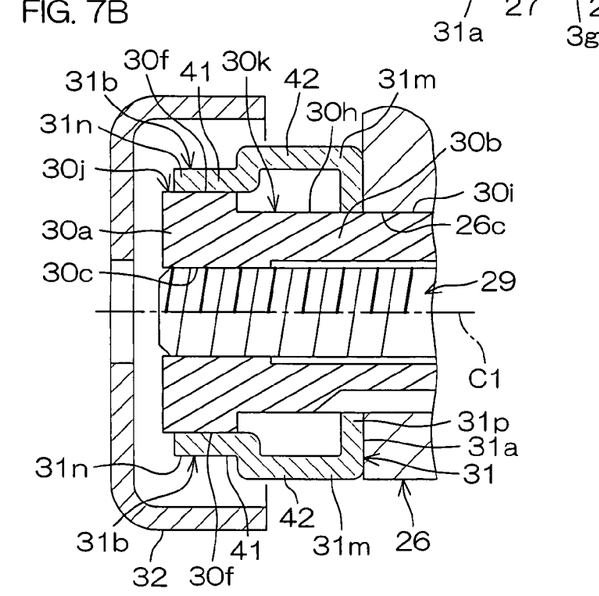
Figure 8A:
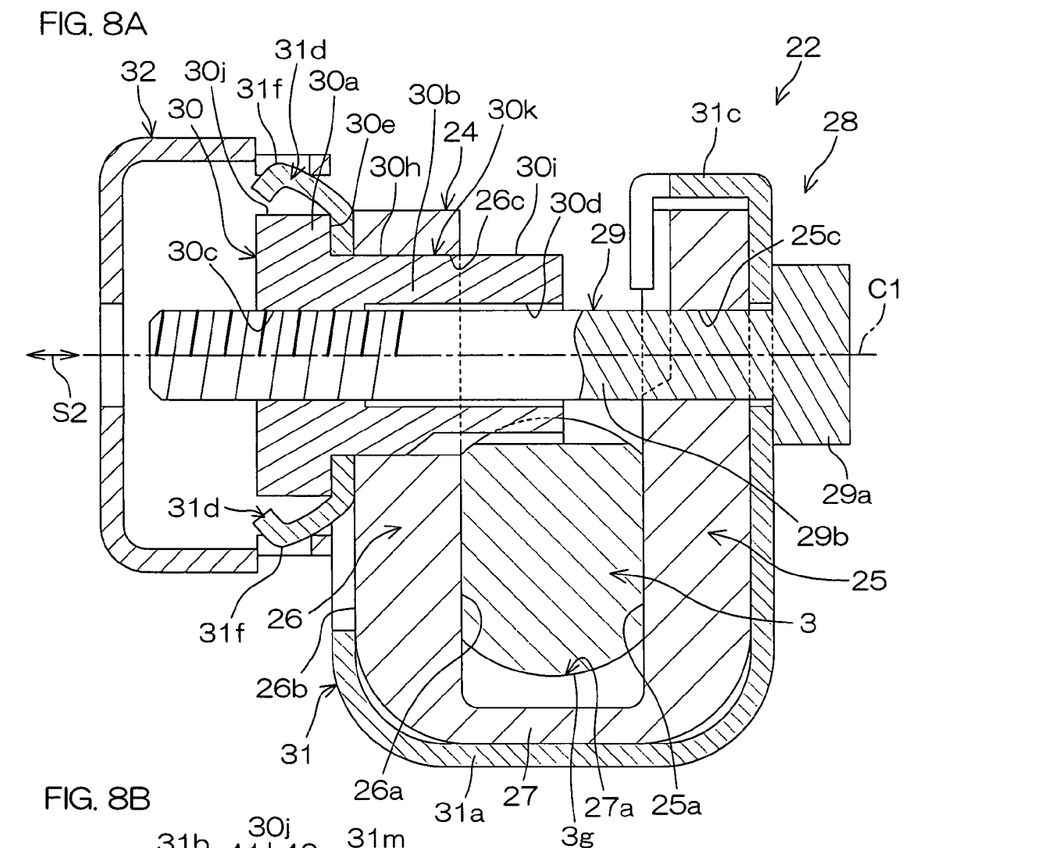
FIGS. 8A and 8B are respectively sectional views of a coupling structure in the later stages of a shaft fixing process.
Figure 8B:
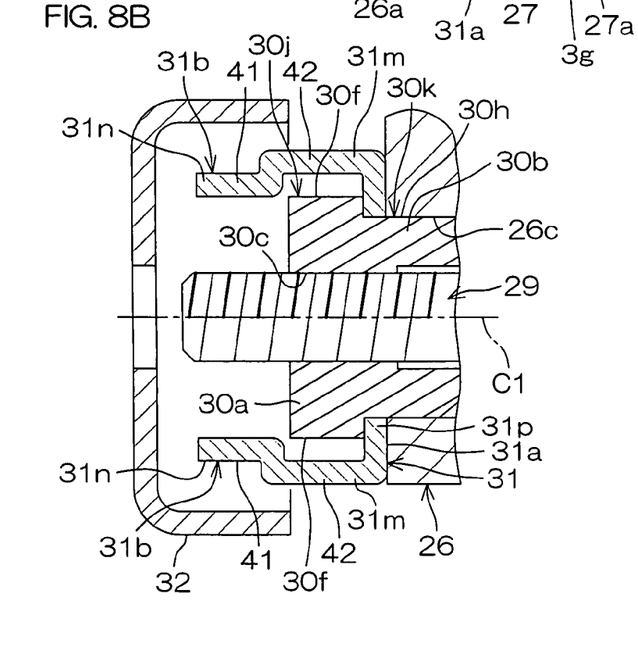

FIG. 6 is a side view of the coupling structure 22 in which the shaft 3 has not been fixed, illustrating a state where the cover 32 (indicated by a one-dot and dash line) is removed. FIGS. 7A and 7B are respectively a longitudinal sectional view and a transverse sectional view of the coupling structure 22 in the early stages of a shaft fixing process. FIGS. 8A and 8B are respectively sectional views of the coupling structure 22 in the later stages of the shaft fixing process.

Referring to FIGS. 6 and 7B, an outer peripheral surface 30j of the nut main body 30a includes a pair of flat surfaces 30f parallel to a center axis of the screw hole 30c of the nut 30, and two convexly-curved surfaces 30g for connecting edges of the pair of flat surfaces 30f to each other.

Referring to FIGS. 7A, 7B, 8A, and 8B, an outer peripheral surface 30k of the cylindrical portion 30b includes a portion to be held 30h adjacent to the nut main body 30a in a direction parallel to the fastening axis C1 and a cam portion 30i adjacent to the portion to be held 30h. The portion to be held 30h is formed of a cylindrical surface concentric with the screw hole 30c. The portion to be held 30h is fitted into the insertion hole 26c of the second tab 26, and is held so as to be relatively movable along the fastening axis C1 and so as to be relatively rotatable around the fastening axis C1. The cam portion 30i has an outer peripheral surface which is circular in cross section and eccentric from the portion to be held 30h. The cam portion 30i can press a peripheral surface of the shaft 3 as the cylindrical portion 30b rotates, as described later. This allows the nut 30 to be prevented from rotating.

The nut 30 has a self-locking function. As a structure for the self-locking function, a structure having a plate made of synthetic resin having a smaller inner diameter than a bolt diameter at one end of the screw hole 30c of the nut 30 can be illustrated. Other known self-locking structure can be employed.

The nut holding member 31 is locked to the first and second tabs 25 and 26 in the yoke 18. The nut holding member 31 functions as a temporary holding member for temporarily holding the nut 30, which has not been screwed onto the bolt 29, on the fastening axis C1 and temporarily holding the nut 30 at the time of assembling.

Referring to FIGS. 5 and 6, the nut holding member 31 has a nut holding member main body 31a formed in a U shape so as to surround the fitting portion 24, a plurality of engaging pieces 31b serving as a locking portion for locking the nut 30, a plurality of locking arms 31c serving as a locking portion for hanging and locking the nut holding member 31 on the fitting portion 24, and a plurality of elastic tongue pieces 31d serving as a locking portion for locking the cover 32.

The engaging pieces 31b, the locking arms 31c, and the elastic tongue pieces 31d are respectively extended in a curved shape from the nut holding member main body 31a. The nut holding member main body 31a, the engaging pieces 31b, the locking arms 31c, and the elastic tongue pieces 31d are integrally formed of a single material, and are composed of a single sheet-metal molded part. The nut holding member main body 31a having a U shape includes a plate portion 31p along the outer side surface 26b of the second tab 26. The engaging pieces 31b are extended in an orthogonal shape from the plate portion 31p.

The locking arm 31c includes a locking arm 31c hung on the first tab 25 and a locking arm 31c hung on the second tab 26.

The paired engaging pieces 31b are opposed to each other with the fastening axis C1 interposed therebetween. The nut 30, which has not been screwed onto the bolt 29, is elastically held in a pressed state on the fastening axis C1 between the pair of engaging pieces 31b. The engaging piece 31b has a base end 31m communicating with the nut holding member main body 31a and a tip end 31n.

The tip end 31n of the engaging piece 31b is provided with a rotation regulating portion 41 in a flat plate shape engaging with a flat surface 30f on a peripheral surface of the nut main body 30a in the nut 30 into which the bolt 29 has not been screwed. Thus, the pair of engaging pieces 31b temporarily holds the nut 30 which has not been screwed onto the bolt 29 and the nut 30 into which the bolt 29 is being screwed using the rotation regulating portion 41, as shown in FIGS. 7A and 7B. The rotation regulating portion 41 regulates the rotation of the nut 30 around the fastening axis C1 and allows the movement of the nut 30 in an axial direction S2 of the bolt 29, while temporarily holding the nut 30. The engaging piece 31b thus functions as a portion for temporarily holding the nut 30.

A rotation allowing portion 42 for allowing the rotation of the nut 30 is formed between the base end 31m and the tip end 31n of the engaging piece 31b. As shown in FIGS. 8A and 8B, when the cam portion 30i in the cylindrical portion 30b in the nut 30 projects into the fitting portion 24 through the insertion hole 26c of the second tab 26, the rotation allowing portion 42 is opposed to the outer peripheral surface 30j of the nut main body 30a whose locking to the rotation regulating portion 41 has been released, to allow the rotation of the nut 30.

That is, when the bolt 29 is screwed into the nut 30, the nut 30 moves along the fastening axis C1. Thus, the cam portion 30i in the cylindrical portion 30b projects into the fitting portion 24 through the insertion hole 26c of the second tab 26. At the same time, the locking of the nut 30 by the rotation regulating portion 41 at the tip end 31n of the engaging piece 31b is released. As a result, the nut 30 turns with the bolt 29. The engaging piece 31b does not prevent the nut 30 from turning at this time.

Referring to FIGS. 6 and 7A, the plurality of elastic tongue pieces 31d (a pair of the elastic tongue pieces in the present embodiment) are opposed to each other on both sides of the nut 30 arranged on the fastening axis C1. Each of the elastic tongue pieces 31d is composed of a plate portion formed by sheet metal bending in a raised shape on the nut holding member main body 31a. The plate portion projects while being curved from the nut holding member main body 31a.

Referring to FIG. 5, the elastic tongue piece 31d extends from the nut holding member main body 31a such that the direction of its plate portion thickness crosses the fastening axis C1. When the elastic tongue piece 31d is seen in the direction of its plate portion thickness of the elastic tongue piece 31d, the elastic tongue piece 31d is formed so as to be relatively long in a direction along the nut holding member main body 31a and be relatively short in a direction of projection. The elastic tongue piece 31d is supported on the nut holding member main body 31a in a cantilevered shape and is elastically deformed due to bending so that a tip end of the elastic tongue piece 31d moves nearer to and farther away from the fastening axis C1.

Referring to FIGS. 6 and 7A, each of the elastic tongue pieces 31d has an elastic projection 31f for holding the cover 32 and inclined surfaces 31g and 31h for removably mounting the cover 32.

The elastic projection 31f is composed of a corner in a curved shape formed in the elastic tongue piece 31d, is provided in an intermediate portion of the elastic tongue piece 31d in a direction parallel to the fastening axis C1, and projects in a direction away from the fastening axis C1 (corresponding to a direction radially outward from the nut 30). A chamfer portion 31e is formed in a pair of side edges of the elastic tongue piece 31d. Thus, the chamfer portions 31e are also provided at the pair of side edges of the elastic projection 31f. The chamfer portion 31e is composed of a convexly-curved surface serving as a rounded surface.

The inclined surface 31g is arranged nearer to the tip end of the elastic tongue piece 31d than the elastic projection 31f on one surface of the elastic tongue piece 31d. The inclined surface 31h is arranged nearer to a base end of the elastic tongue piece 31d than the elastic projection 31f on the one surface of the elastic tongue piece 31d. The inclined surfaces 31g and 31h are inclined in opposite directions with respect to a direction parallel to the fastening axis C1. The direction parallel to the fastening axis C1 corresponds to a direction in which the cover 32 is mounted and removed. The inclined surface 31g functions as a guide for mounting the cover 32, and the inclined surface 31h functions as a guide portion for removing the cover 32.

Referring to FIG. 5, the cover 32 is composed of a metallic member having a closed-end cylindrical shape, and is specifically composed of a sheet-metal molded part. The cover 32 may be a member made of synthetic resin. The cover 32 includes a cylindrical portion 32a surrounding the nut 30 and a bottom 32b extending radially inward from one edge of the cylindrical portion 32a. A through hole is formed at the center of the bottom 32b. The other edge of the cylindrical portion 32a is opened as an inlet for the nut 30.

Figure 9A:
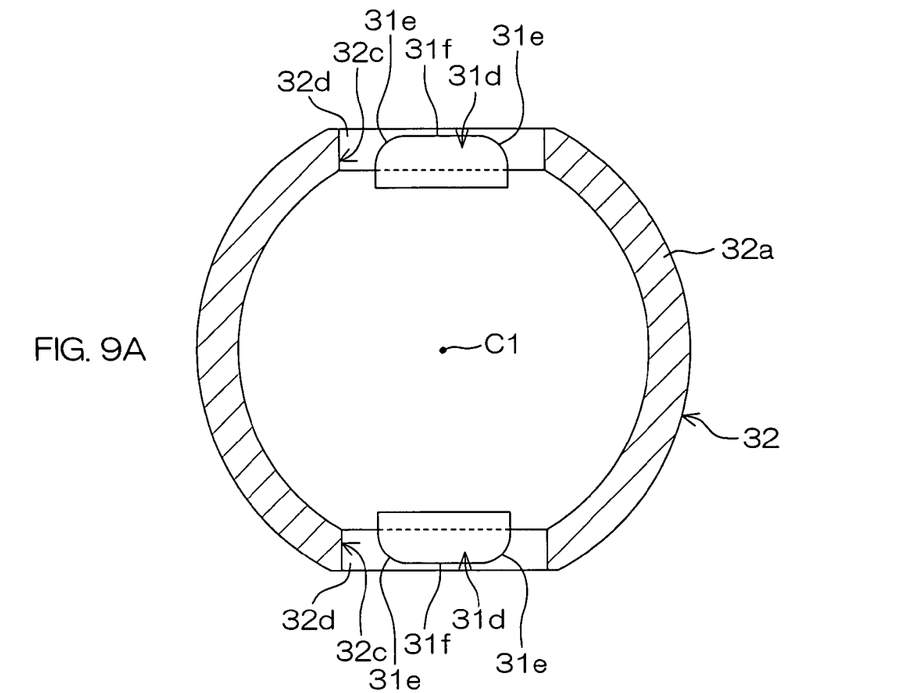
Figure 9B:
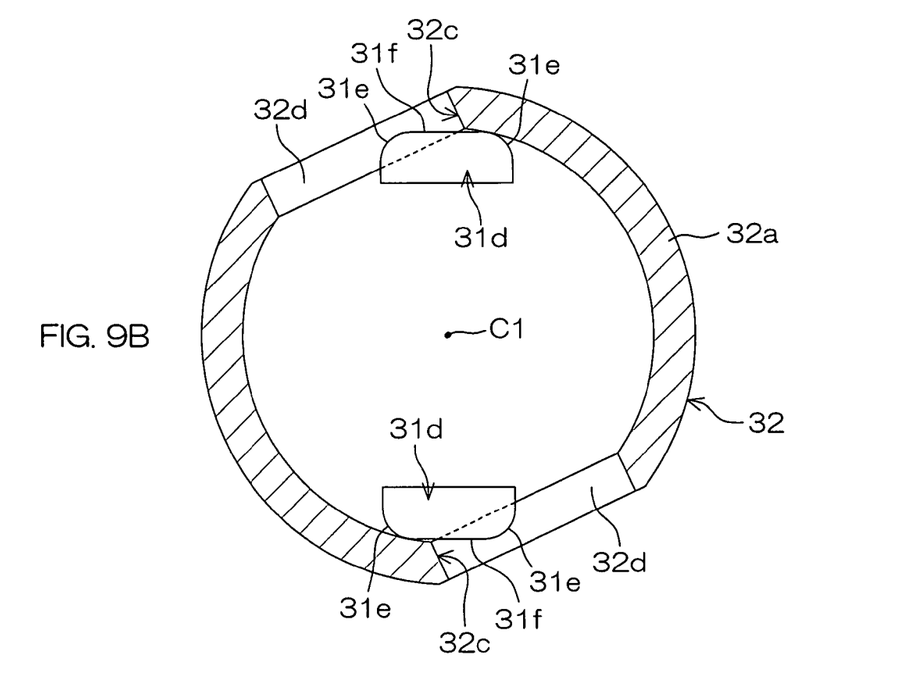

FIGS. 9A and 9B are respectively partially sectional front views of the cover 32 and the elastic tongue piece 31d, where FIG. 9A shows a state where the cover 32 and the elastic tongue piece 31d engage with each other, and FIG. 9B shows a state where the engagement is being released.

Referring to FIGS. 5 and 9A, the cylindrical portion 32a has a plurality of fitting recesses 32c opposed to each other. A pair of the fitting recesses is provided corresponding to the elastic projection 31f. The elastic projection 31f is elastically fitted into the fitting recess 32c, as described later. The fitting recess 32c has an opening in a rectangular shape and an edge surrounding the opening. A portion 32d, on the side of the inlet, of the edge is formed so as to be flat, and serves as a portion for preventing the cover 32 from coming off by engaging with the fitted elastic projection 31f.

Referring to FIGS. 7A and 9A, the elastic tongue piece 31d is arranged inside the cover 32 in a mounted state. The elastic projection 31f of the elastic tongue piece 31d is elastically fitted into the fitting recess 32c from the inside of the cover 32, thereby holding the cover 32. The elastic projection 31f is prevented from projecting radially outward from an outer peripheral surface of the cover 32.

In a state where the elastic tongue piece 31d is not elastically deformed, a clearance between tip ends of the pair of elastic projections 31f is set to a size equal to or larger than a clearance between portions 32d of the pair of fitting recesses 32c in the cover 32. When the cover 32 is held by the nut holding member 31, the elastic tongue piece 31d is elastically deformed due to bending. Its elastic restoring force causes the elastic projection 31f to be autonomously fitted into the fitting recess 32c in the cover 32. Further, the elastic projection 31f and the inclined surface 31h of the elastic tongue piece 31d elastically press the portion 32d at the edge of the fitting recess 32c in the cover 32 against the nut holding member main body 31a in the nut holding member 31. Since the elastic projection 31f is elastically fitted into the fitting recess 32c, the cover 32 can be prevented from coming off even if vibration and shock are exerted on the cover 32.

Referring to FIGS. 6 and 7A, the cover 32 held by the nut holding member 31 covers the pair of engaging pieces 31b in the nut holding member 31, the nut main body 30a in the nut 30, and a clearance therebetween so as to collectively surround them. The nut main body 30a covered with the cover 32 includes the nut main body 30a at a position where the bolt 29 has not been screwed, the nut main body 30a at a position where the bolt 29 has been screwed, and the nut main body 30a moving therebetween.

Referring to FIG. 5, the mounting of the cover 32 is achieved by moving the cover 32 along the fastening axis C1 and fitting the cover 32 into the elastic tongue piece 31d in the nut holding member 31. At this time, the inclined surface 31g of the elastic tongue piece 31d is along an edge, on the side of the inlet, of the cover 32, so that the elastic tongue piece 31d is elastically deformed due to bending. Therefore, the elastic projection 31f is fittable into the fitting recess 32c easily beyond the edge of the fitting recess 32c in the cover 32.

Referring to FIGS. 9A and 9B, in order to remove the cover 32, the cover 32 is pulled out of the nut holding member 31 along the fastening axis C1 while turning the cover 32 against the nut holding member 31 around the fastening axis C1. When the cover 32 is turned, the edge of the fitting recess 32c in the cover 32 moves onto the chamfer portion 31e in the elastic tongue piece 31d, so that the elastic tongue piece 31d is elastically deflected radially inward. The inclined surface 31h of the deflected elastic tongue piece 31d can easily move beyond the portion 32d at the edge of the fitting recess 32c in the cover 32, which allows the fitting between the elastic projection 31f and the fitting recess 32c to be easily released. The cover 32 may be removed without being turned.

Returning to FIGS. 4 and 5, the first and second tabs 25 and 26 of the fitting portion 24 respectively have inner side surfaces 25a and 26a serving as holding portions inside the fitting portion 24. The inner side surfaces 25a and 26a of the pair of tabs 25 and 26 and the inner side surface 27a of the connecting portion 27 define an accommodation groove for incorporating the shaft 3 from the opening side of the U shape.

Referring to FIGS. 3 and 5, a cross-sectional shape at the end 3b of the shaft 3 is an oval shape that is long along one radius of the shaft 3. A peripheral surface at the end 3b of the shaft 3b has side surfaces 3d and 3e serving as a pair of flat portions to be held with a width across flat formed therebetween, a bottom surface 3g serving as an opposed portion to which one ends of side surfaces 3d and 3e are connected, and a top surface 3h to which the other ends of side surfaces 3d and 3e are connected. The bottom surface 3g forms a convexly-curved shape, e.g., a circular arc shape in section. The top surface 3h is formed in a convexly-curved circular arc shape, and its part is formed to be a flat surface.

Referring to FIGS. 5 and 6, the procedure for assembling will be described. First, the nut holding member 31 is assembled into the fitting portion 24 in the yoke 18. Then, the nut 30 is held by the engaging piece 31b in the nut holding member 31 in such a manner that the cylindrical portion 30b in the nut 30 does not extend into the fitting portion 24 and in such a manner that the end surface 30e serving as a bearing surface of the nut main body 30a in the nut 30 is spaced apart from the nut holding member 31. The cover 32 is then held by the nut holding member 31.

Referring to FIGS. 6 and 7A, the shaft 3 is then fitted into the fitting portion 24. The bolt 29 is then screwed into the held nut 30.

Referring to FIGS. 7A and 8A, when the bolt 29 is screwed into the nut 30, the nut 30 moves in the axial direction S2 of the bolt 29 while the rotation of the nut 30 is regulated by the nut holding member 31. The cylindrical portion 30b in the nut 30 extends into the fitting portion 24, as shown in FIG. 8A, and the locking between the nut main body 30a and the nut holding member 31 is released, as shown in FIG. 8B. When the bolt 29 is further screwed in this state, the nut 30 turns with the bolt 29.

Referring to FIGS. 3 and 4, as the bolt 29 is screwed into the nut 30, the cam portion 30i in the cylindrical portion 30b in the nut 30 is opposed to and abutted against a flat portion of the top surface 3h on the peripheral surface of the shaft 3 in a portion where the distance from the fastening axis C1 is larger. As a result, the shaft 3 is pressed against the inner side surface 27a by the nut 30, and is held between the cam portion 30i in the nut 30 and the inner side surface 27a. The end 3b of the shaft 3 is fastened between the head 29a of the bolt 29 and the nut main body 30a in the nut 30 through the pair of tabs 25 and 26.

The coupling structure 22 between the yoke 18 and the shaft 3 in the universal joint 10 according to the present embodiment comprises the yoke 18 in the universal joint 10 including the fitting portion 24 having the first and second tabs 25 and 26 parallel to each other to form a U shape, the shaft 3 incorporated into the fitting portion 24 in the yoke 18, the fixing mechanism 28 comprising the bolt 29 penetrating the first and second tabs 25 and 26 and the nut 30 screwed onto the bolt 29 on the fastening axis C1 and fastening and fixing the shaft 3 between the first and second tabs 25 and 26, the nut holding member 31 having the engaging piece 31b locked to the second tab 26 for locking the nut 30 which has not been screwed onto the bolt 29, such that the nut 30 is held on the fastening axis C1, and the cover 32 held by the nut holding member 31 and covering at least the engaging piece 31b around the nut 30.

According to the present embodiment, when the above-mentioned coupling structure 22 is arranged in the interior of a crew compartment of an automobile, for example, a carpet or the like in the crew compartment is not caught by the engaging piece 31b and is not caught therein as a steering operation is performed. Further, a foreign material can be prevented from accumulating between the nut 30 and the engaging piece 31b. Since the cover 32 is held by the nut holding member 31 for the nut 30, the number of components can be made smaller, as compared with that in a case where a holding member (not shown) dedicated to the cover 32 is provided separately from the nut holding member 31 for the nut 30, so that the manufacturing cost can be reduced.

Although it is also considered that the cover 32 is fixed to the nut holding member 31, the cover 32 is removably mounted on the nut holding member 31 in the present embodiment. That is, the cover 32 is allowed to be removed from the nut holding member 31 when a predetermined state (a state where the elastic projection 31f and the fitting recess 32c are fitted into each other in the present embodiment) is released, and is mounted with the removal from the nut holding member 31 regulated in the above-mentioned predetermined state. The removal of the cover 32 allows maintenance to be easily made. Moreover, the regulation of the removal of the cover 32 prevents the cover 32 from unintendedly coming off.

In the present embodiment, the nut holding member 31 has the elastic projection 31f for holding the cover 32, the cover 32 includes a cylindrical portion 32a surrounding the nut 30, and the cylindrical portion 32a has a fitting recess 32c in which the elastic projection 31f is elastically fitted. Thus, the elastic fitting between the elastic projection 31f and the fitting recess 32c can prevent the cover 32 from coming off. Since the fitting between the elastic projection 31f and the fitting recess 32c can be released by elastically deforming the elastic projection 31f, the cover 32 can be more easily removably mounted, as compared with the cover 32 mounted by caulking and press fitting. As a result, it does not take much time and labor to make maintenance. Further, a structure for holding the cover 32 can be simplified by the elastic projection 31f and the fitting recess 32c of the cylindrical portion 32a. The elastic projection 31f is formed integrally with the nut holding member 31 for holding the nut 30, and the fitting recess 32c is formed integrally with the cover 32. As a result, the manufacturing cost can be reduced.

In the present embodiment, the cover 32 is turned around the axis of the cylindrical portion 32a (which coincides with the fastening axis C1) or is pulled along the axis so that the fitting between the fitting recess 32c of the cylindrical portion 32a in the cover 32 and the elastic projection 31f of the nut holding member 31 is released. This allows the cover 32 to be removed by being twisted and pulled or be pulled as it is.

The universal joint 22 is arranged in the interior of the crew compartment of the automobile, the carpet in the crew compartment is liable to be caught, and a carpeting fiber or the like is liable to adhere to the universal joint. However, the problems can be solved by the above-mentioned cover 32.

A modified example, described below, to the present embodiment can be considered. In the following description, points different from those in the above-mentioned embodiment will be mainly described, and the same constituent elements are assigned the same reference numerals and, the description thereof is not repeated.

For example, the nut holding member 31 may be locked to only a portion, which is provided with the nut 30, of the second tab 26 and held therein. Alternatively, the cover 32 may cover at least the engaging piece 31b around the nut 30, and may have a plurality of portions formed separately from one another. Further, a through hole at the bottom 32b of the cover 32 may be closed.

Only either one of the coupling structures 22 and 23 may be the coupling structure described in the above-mentioned embodiment. Note that at least one of the coupling structures 22 and 23 may be the coupling structure described in the above-mentioned embodiment.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The present application corresponds to Japanese Patent Application No. 2006-95408 filed with the Japanese Patent Office on Mar. 30, 2006, the disclosure of which is herein incorporated by reference.

What is claimed is:

1. A universal joint, comprising:
  a yoke including a fitting portion for fitting a shaft, the fitting portion having a first tab and a second tab parallel to each other to form a U-shape for receiving the shaft between interior surfaces of the tabs;

a fixing mechanism for fastening and fixing the shaft between the first tab and the second tab, and including a bolt passing through an insertion hole provided in the first tab and an insertion hole provided in the second tab, and a nut screwed onto the bolt on a fastening axis of the bolt, a head of the bolt abutting an exterior surface of the fist tab and the nut being movable toward an exterior surface of the second tab and being extendable through the insertion hole in the second tab to engage the shaft;

a nut holding member fixed the exterior surface of the second tab, and having an elastic projection, and an engaging piece protruding outwardly from the second tab, the engaging piece comprising a distal portion non-rotatably engaging with the nut to retain the nut at a spaced distance from the exterior surface of the second tab such that the nut, which has not been screwed onto the bolt, is held in alignment with the fastening axis of the bolt and preventing rotation of the nut to enable the nut to be screwed onto the bolt and move towards the second tab along the fastening axis, the engaging piece further comprising a proximal portion between the distal portion and the exterior surface of the tab which allows rotation of the nut once the nut has been moved toward the second tab so as to be free of contact with the distal portion; and a cover held by the elastic projection, and being removably mounted on the nut holding member and covering at least the engaging piece around the nut, the cover having a cylindrical portion surrounding the nut, the cylindrical portion having a fitting recess in which the elastic projection is elastically fitted.

2. The universal joint according to claim 1, wherein:

when the cover is operated to rotate at a predetermined torque around the axis of the cylindrical portion in the cover or is pulled by a predetermined force along the axis of the cover, a fitting between the fitting recess of the cylindrical portion in the cover and the elastic projection of the nut holding member is released.

3. The universal joint according to claim 1, wherein:

the nut holding member includes a nut holding member main body fixed to the fitting portion, and the nut holding member main body includes a plate portion along an outer side surface of the second tab, and the engaging piece is extended from the plate portion.

4. The universal joint according to claim 3, wherein:

the nut includes a nut main body having a screw hole, an outer peripheral surface of the nut main body includes a flat surface, and the engaging piece in the nut holding member includes a rotation regulating portion engaging with the flat surface for regulating the rotation of the nut.

5. The universal joint according to claim 4, wherein:

the engaging piece has a base end continuous with the nut holding member main body and a tip end, and the rotation regulating portion is provided at the tip end of the engaging piece.

6. The universal joint according to claim 5, wherein:

a rotation allowing portion for allowing the rotation of the nut is provided between the base end and the tip end of the engaging piece in a state where the rotation allowing portion is opposed to the outer peripheral surface of the nut main body.

7. The universal joint according to claim 1, wherein:

the nut includes a nut main body having an end surface opposed to the second tab and a cylindrical portion extended from the end surface of the nut main body and fitted into the insertion hole in the second tab, an outer peripheral surface of the cylindrical portion in the nut includes a cam portion capable of advancing into an area between the first tab and the second tab as the nut rotates, and the cam portion presses the shaft fitted into the fitting portion as the nut rotates, so that the shaft is fixed to the fitting portion.

8. The universal joint according to claim 7, wherein:

the outer peripheral surface of the cylindrical portion of the nut includes a portion to be held fittable into the insertion hole in the second tab, the portion to be held is arranged between the nut main body and the cam portion, and the cam portion and the portion to be held form cylindrical shapes eccentric from each other.

\* \* \* \* \*